United States Patent [19]

McCarthy et al.

[11] 4,042,512
[45] Aug. 16, 1977

[54] OIL WATER SEPARATOR

[76] Inventors: Patrick M. McCarthy, 486 Sayville Blvd., Sayville, Long Island, N.Y. 11782; Gilbert T. McTighe, 804 N. Windsor, Apt. 10; Robert T. McTighe, 804 N. Windsor, Apt. 6, both of Mitchell, S. Dak. 57301

[21] Appl. No.: 736,247

[22] Filed: Oct. 27, 1976

[51] Int. Cl.² .............................................. B03D 3/00
[52] U.S. Cl. ..................................... 210/519; 210/521
[58] Field of Search ................................. 210/519, 521

[56] References Cited

U.S. PATENT DOCUMENTS

| 1,702,612 | 2/1929 | Morse | 210/519 X |
| 3,182,799 | 5/1965 | Krofta | 210/521 |
| 3,923,659 | 12/1975 | Ullrich | 210/521 X |
| 3,953,332 | 4/1976 | Speth et al. | 210/521 |
| 3,957,656 | 5/1976 | Castelli | 210/521 |

Primary Examiner—John Adee
Attorney, Agent, or Firm—Bacon & Thomas

[57] ABSTRACT

A cylindrical tank arranged with its axis horizontal has an inlet at the top, at one end, arranged to direct drainage water mixed with oil onto the upper portion of a first sloping and transversely corrugated baffle member of less height than the tank but extending transversely across its interior. Spaced parallel baffle plates, also transversely corrugated and of less width than the tank, direct flow from the first baffle member upwardly and inwardly. A clarified water outlet extends to near the bottom of the tank at the other end and an oil withdrawing conduit is arranged to withdraw oil from the upper region of the tank near that other end. The tank is also provided with a sludge arresting baffle plate across its bottom and a sludge withdrawal access opening at its top.

6 Claims, 4 Drawing Figures

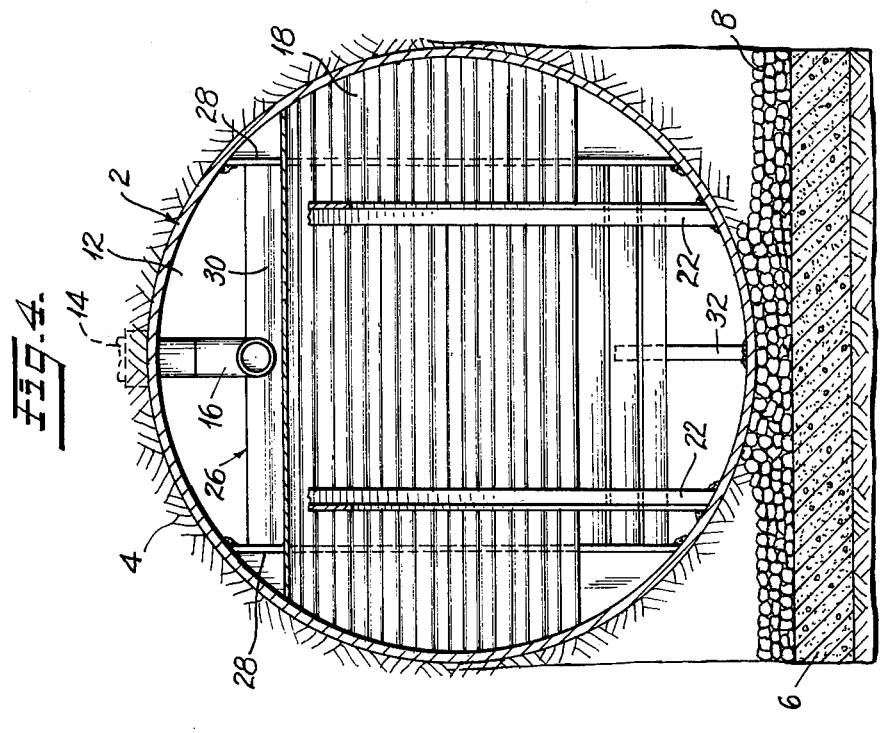
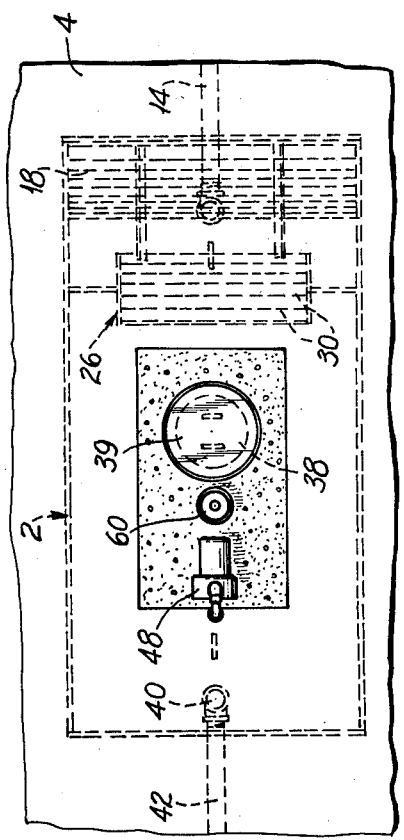
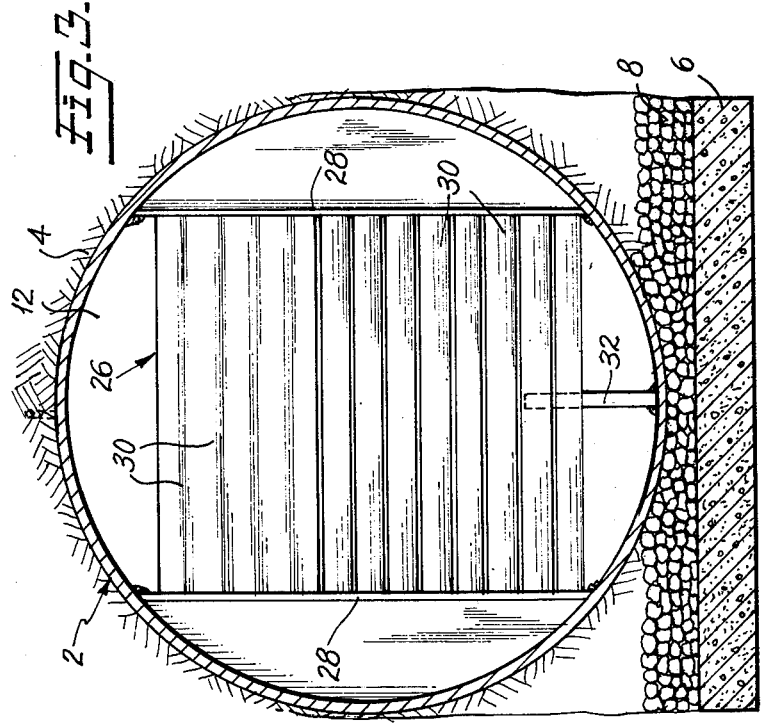

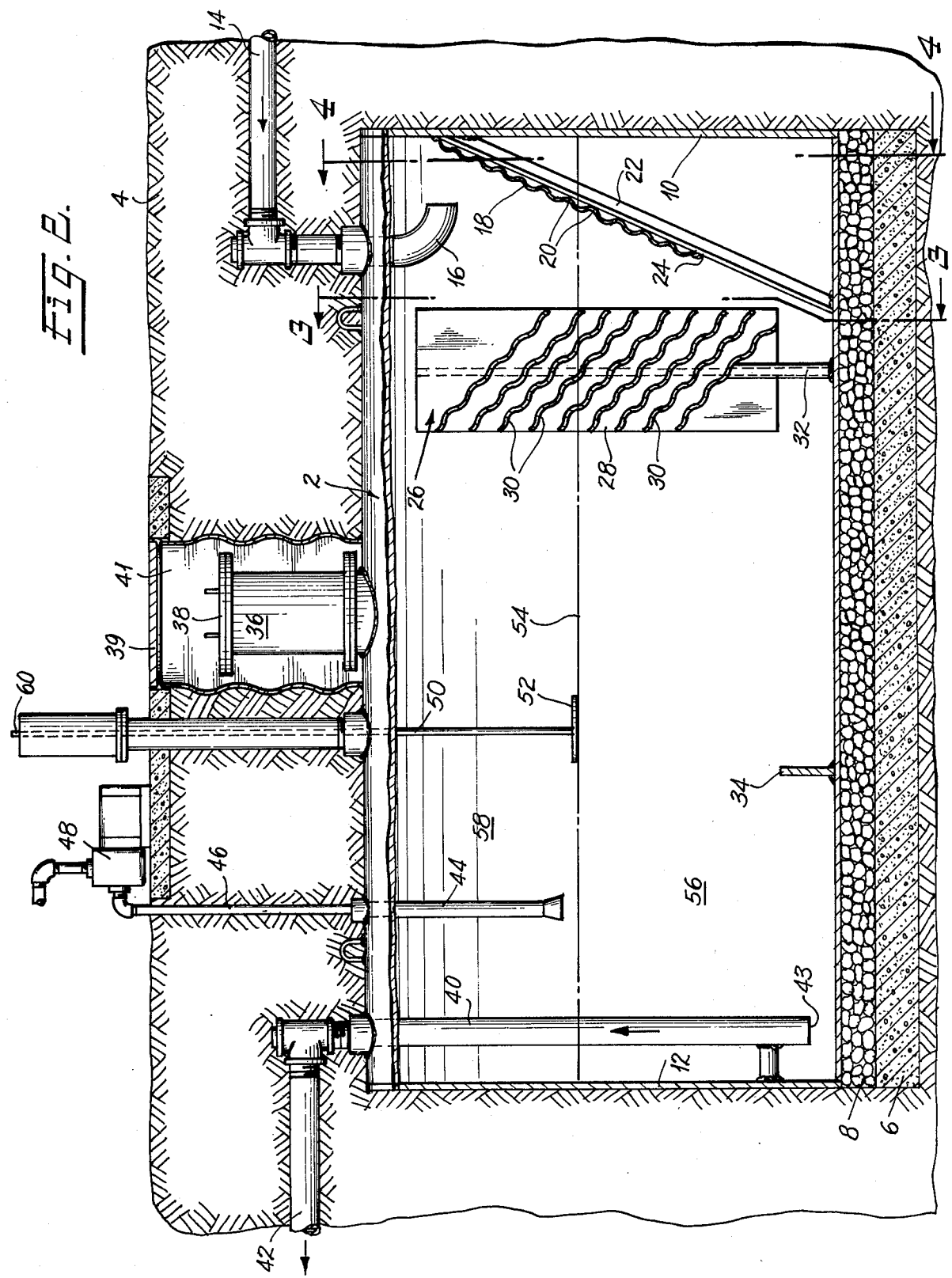

OIL WATER SEPARATOR

BACKGROUND OF THE INVENTION

This invention is in the field of oil-water separators and particularly in the field of apparatus for clarifying run-off or drainage water containing oil and/or other lightweight materials.

Many devices have been proposed heretofore for separating oil and other lightweight materials from run-off or drainage water to avoid pollution of streams, lakes, or the like. However, such previous proposals have not been completely satisfactory and have required considerable attention and maintenance, some even requiring the maintenance of moving parts. Some such prior devices included corrugated surfaces over which the mixture was caused to flow. See for example U.S. Pat. Nos. 1,775,233; 2,207,399 and 3,346,122.

SUMMARY OF THE INVENTION

A principal object of this invention is to provide an oil-water separator capable of substantially constant operation with substantially no attention and requiring a minimum of maintenance.

In general, the apparatus comprises a stationary tank having an inlet at one end directing incoming material onto a sloping corrugated baffle member over which the material flows downwardly and inwardly and from which the fluids are directed between upwardly sloping parallel corrugated plates to accelerate separation of water and oil or similar lightweight materials. The material flows toward the other end of the tank from which clarified water is permitted to escape from the lower regions and separated oil is withdrawn from the top. Baffle means are also provided in the bottom of the tank to intercept particulate matter settling to the bottom and an access opening adjacent the baffle permits periodic cleaning of such collected solids from the tank.

BRIEF DESCRIPTION OF THE DRAWINGS

FIG. 1 is a plan view illustrating a tank embodying the present invention buried below the surface of the ground;

FIG. 2 is a vertical longitudinal section, on an enlarged scale, of the installation shown in FIG. 1;

FIG. 3 is a transverse sectional view taken on the line 3—3 of FIG. 2; and

FIG. 4 is a transverse sectional view taken along the line 4—4 of FIG. 2.

DESCRIPTION OF A PREFERRED EMBODIMENT

Referring first to FIG. 2 a generally cylindrical tank 2 is shown buried beneath the ground 4 and supported by suitable concrete or other base 6 and cushioning material 8, such as sand. The tank 2 has ends 10 and 12, end 10 being at the entrance end thereof. Inlet piping 14 terminates inside the tank 2 in a nozzle structure 16 directed generally toward the end 10. It is contemplated that run-off or drainage water containing oil or the like will first be treated in an interceptor unit (not shown) for separating heavy solid or sludge materials.

The mixture entering the tank 2 is directed by nozzle 16 onto a downwardly and inwardly sloping baffle member 18 shown as having corrugations 20 extending transversely thereacross. The baffle member 18 may be supported by suitable struts 22 welded or otherwise secured to the interior of the tank. As best shown in FIG. 4, the transversely corrugated member 18 extends completely across the interior of the tank and may be suitably secured to the side walls thereof. However, the bottom edge 24 of baffle member 18 terminates a substantial distance upwardly from the bottom of the tank 2, as also clearly shown in FIG. 4. Adjacent the baffle member 18 is a generally rectangular framework 26 (see also FIG. 3) comprising opposed side plates 28 between which a plurality of corrugated plates 30 extend. The plates 30 are arranged with their corrugations extending transversely of the tank 2 and are arranged to slope upwardly and inwardly of the end 10 from the general region of the lower edge 24 of baffle member 18. The lowermost plate 30 is likewise spaced upwardly from the bottom of the tank 2, as also shown in FIG. 3, and a stabilizing support member 32 may be provided.

Between the plurality of plates 30 and the opposite end 12 of tank 2 a vertically extending transverse baffle plate 34 is fixed to the bottom of the tank. Above the region between baffle plate 34 and plates 30, in the top of the tank 2, is a manhole or access opening arrangement 36 normally closed by a suitable cover 38 accessible from the surface of the ground and a protective cover 39 is shown closing a pit 41 in which the arrangement 36 is located. Adjacent the end 12 of the tank an outlet pipe 40 extends downwardly to a position at its open end 43 adjacent the bottom of the tank 2 and is connected, through the top of the tank, to suitable discharge piping 42 through which clarified water may be discharged to the environment. Also adjacent the end 12 of the tank is an oil withdrawal tube 44 extending downwardly to a position terminating in the upper region of the tank 2 and connected by piping 46 to a suitable withdrawal pump 48 or the like. If desired, a level indicating device 50 may be installed in the tank having a sensing member 52 buoyant in water but not buoyant in oil. Thus, the sensing member 52 will follow the interface 54 between clarified water 56 and collected oil 58. The indicator may have an upper stem portion 60 visible from above the ground and which may be graduated to indicate the quantity of oil collected in the tank so that oil may be withdrawn through tube 44 when the interface 54 has dropped to a level below the lower end of withdrawal tube 44. If desired, the level indicating device may include control means for starting and stopping the motor driven pump 48 at the desired time.

In operation, an oil-water mixture directed by nozzle 16 onto baffle member 18 is caused to disperse thereover and cascade downwardly over the corrugations 20. This enhances agglomeration of oil particles and facilitates their buoyant separation from the water as the material cascades downwardly over the baffle member. Any remaining solid particles or heavy matter introduced into the tank may fall from the lower edge 24 of baffle member 20 to the bottom of the tank but it cannot migrate from there to the outlet pipe 40 since baffle plate 34 will intercept and hold the same. Any particles of oil flowing downwardly with the water over baffle member 18 will necessarily start to flow toward the end 12 of the tank and the water containing oil particles will pass between the corrugated plates 30 and be directed upwardly, thus inducing upward flow of at least the oil particles and again facilitating agglomeration and buoyant separation from the water. The region of the tank between the plates 30 and outlet 40 provides for further gravitational separation of water from oil so that only substantially clarified water reaches the outlet 40 to flow therefrom or to be withdrawn in any suitable manner.

Separator devices according to the present invention may be constructed in relatively large sizes capable of handling many thousands of gallons of material per day. Devices constructed according to the present invention conform to the general standards of the American Petroleum Institute's specification for oil-water separation, comply with all State and Federal spill requirements and have proven highly satisfactory.

At intervals, the covers 39 and 38 may be removed thus providing access to the interior of tank 2 and permitting the removal of sludge or solid particles that have collected behind the baffle plate 34, previously described.

While a single specific embodiment of the invention has been shown and described herein, the same is merely illustrative of the principles involved and other embodiments may be resorted to within the scope of the appended claims.

The embodiments of the invention in which an exclusive property or privilege is claimed are defined as follows:

1. An oil-water separator comprising:
   a tank;
   an oil-water mixture inlet at one end of said tank adjacent the top thereof;
   a baffle member in said one end of said tank, sloping downwardly and inwardly from adjacent the top thereof toward the bottom of said tank adjacent said one end and having an upper surface defining transverse corrugations, said inlet being arranged to direct the incoming oil-water mixture onto the upper portion of said surface;
   a plurality of parallel, transversely corrugated and spaced baffle plates in said tank sloping upwardly and away from said one end from a region adjacent but spaced from the lowermost portion of said baffle member;
   outlet means at the other end of said tank adjacent the bottom thereof for withdrawing clarified water therefrom; and
   further means in said tank, adjacent said other end, for withdrawing separated oil from the upper portion of said tank.

2. A separator as defined in claim 1 including an imperforate transverse baffle plate extending upwardly a short distance from the bottom of said tank between said plurality of baffle plates and said further means; and an access opening in the top of said tank over the regions between said imperforate baffle plate and said plurality of baffle plates.

3. A separator as defined in claim 2 wherein said tank is a cylinder with its axis extending horizontally, the said ends of said tank being the axial ends of said cylinder.

4. A separator as defined in claim 1 wherein the lower edge of said baffle member is spaced upwardly from the bottom of said tank.

5. A separator as defined in claim 4 wherein said baffle member extends laterally across the interior of said tank, from side to side thereof.

6. A separator as defined in claim 1 wherein said plurality of baffle plates extend only partly transversely across the interior of said tank in the central region thereof, the uppermost and lowermost plates of said plurality being spaced from the top and bottom, respectively, of said tank.

* * * * *